United States Patent
Rapolu et al.

(10) Patent No.: US 11,985,241 B2
(45) Date of Patent: May 14, 2024

(54) METHOD AND SYSTEM FOR TOKEN TRANSFER

(71) Applicant: Visa International Service Association, San Francisco, CA (US)

(72) Inventors: Sushma Rapolu, San Rafael, CA (US); Anup Tripathi, San Mateo, CA (US); Sashi Kumar Velur, Austin, TX (US); Cristian Dumitru, Austin, TX (US); Nicholas Boesel, San Francisco, CA (US); Mitchell Wright, San Mateo, CA (US); Abhishek Verma, Denver, CO (US)

(73) Assignee: Visa International Service Association, San Francisco, CA (US)

( * ) Notice: Subject to any disclaimer, the term of this patent is extended or adjusted under 35 U.S.C. 154(b) by 302 days.

(21) Appl. No.: 17/491,116

(22) Filed: Sep. 30, 2021

(65) Prior Publication Data
US 2022/0209952 A1 Jun. 30, 2022

Related U.S. Application Data

(60) Provisional application No. 63/131,642, filed on Dec. 29, 2020.

(51) Int. Cl.
*H04L 9/32* (2006.01)
*H04L 29/06* (2006.01)

(52) U.S. Cl.
CPC .......... *H04L 9/3213* (2013.01); *H04L 9/3226* (2013.01); *H04L 9/3271* (2013.01)

(58) Field of Classification Search
CPC . H04L 9/3213; H04L 63/0807; H04L 9/3271; H04L 63/0428; H04L 9/3226; H04L 63/083
See application file for complete search history.

(56) References Cited

U.S. PATENT DOCUMENTS

| | | | | |
|---|---|---|---|---|
| 8,800,003 | B2* | 8/2014 | Guo | H04L 63/0823 |
| | | | | 726/4 |
| 10,944,742 | B2* | 3/2021 | Mumma | G06F 21/41 |
| 11,244,297 | B1* | 2/2022 | Puffer | G06Q 20/3672 |
| 11,657,389 | B2* | 5/2023 | Eng | G06Q 20/385 |
| | | | | 705/44 |
| 2014/0245396 | A1* | 8/2014 | Oberheide | G06F 21/40 |
| | | | | 726/4 |
| 2018/0165781 | A1* | 6/2018 | Rodriguez | G06Q 20/3821 |
| 2018/0336553 | A1* | 11/2018 | Brudnicki | G06Q 20/385 |

(Continued)

*Primary Examiner* — Mohammad A Siddiqi
(74) *Attorney, Agent, or Firm* — Kilpatrick Townsend & Stockton LLP

(57) ABSTRACT

The present embodiments relate to a sender sharing a credential associated with a user device to a recipient, allowing temporary access to the user device by the recipient. The sender can specify a user in which to share the credential and can set control parameters relating to the use of the user device by the recipient. The authorizing entity computer can transmit an credential identifier to the processing network computer and receive an encrypted credential from the processing network computer. The authorizing entity computer can transmit the encrypted credential to a storage application on the recipient computer. The recipient computer can then transmit a request to the processing network computer for a token and then obtain the token.

20 Claims, 13 Drawing Sheets

(56) References Cited

U.S. PATENT DOCUMENTS

| | | | |
|---|---|---|---|
| 2020/0027302 A1* | 1/2020 | Petersen | G07F 17/323 |
| 2021/0004454 A1* | 1/2021 | Chester | H04L 63/0807 |
| 2021/0132912 A1* | 5/2021 | Trillo Vargas | G06Q 10/103 |
| 2021/0184858 A1* | 6/2021 | Perry | G06F 21/31 |

* cited by examiner

METHOD AND SYSTEM FOR TOKEN TRANSFER

CROSS-REFERENCES TO RELATED APPLICATIONS

This application claims priority to U.S. Provisional Patent Application No. 63/131,642, filed on Dec. 29, 2020, where the contents of which is incorporated by reference in its entirety.

BACKGROUND

Computing devices (e.g., a mobile phone) can implement storage applications configured to securely store access data such as credentials or tokens relating to a user device. For example, a storage application such as a digital wallet can store a token specific to the user device and the storage application. The token stored at the storage application can be provided in a request to initiate a transaction, and a processing network can identify a credential for the user device using the token. The credential can be used to authorize a transaction.

In many instances, a user associated with the user device may want to provide the access data to the user device to another user. However, there can be a number of problems with doing so. For example, some peer-to-peer (P2P) applications may only be able to share resources across accounts with the same provider. Also, while a physical device with access data such as a card could be issued to the additional user, the additional user needs to wait for a period of time before they can use the physical device Embodiments of the invention address these and other problems, individually and collectively.

SUMMARY

Embodiments of the present embodiments relate to a sender sharing a credential associated with a user device to a recipient, allowing temporary access to the user device by the recipient. The sender can specify a user in which to share the credential and can set a variety of control parameters relating to the use of the user device by the recipient. The recipient can access the user device via a wallet application on a recipient computer.

One embodiment of the invention includes a method comprising: receiving, by an authorizing entity computer, a request from a sender computer operated by a sender to allow a recipient operating a recipient computer to use a credential of the sender; transmitting, by the authorizing entity computer, the credential to a processing network computer; receiving, by the authorizing entity computer from the processing network computer, a credential identifier associated with the credential; transmitting, by the authorizing entity computer, the credential identifier to the processing network computer, which thereafter initiates provisioning of a token corresponding to the credential to a storage application on the recipient computer; and receiving, by the authorizing entity computer, a notification that the token is active in the storage application on the recipient computer.

Another embodiment of the invention includes an authorizing entity computer comprising: a processor; and a non-transitory computer readable medium comprising instructions executable by the processor, causing the processor to perform operations including: receiving a request from a sender computer operated by a sender to allow a recipient operating a recipient computer to use a credential of the sender; transmitting the credential to a processing network computer; receiving, from the processing network computer, a credential identifier associated with the credential; transmitting the credential identifier to the processing network computer, which thereafter initiates provisioning of a token corresponding to the credential to a storage application on the recipient computer; and receiving a notification that the token is active in the storage application on the recipient computer.

Another embodiment of the invention is directed to a method comprising: receiving, by a processing network computer from an authorizing entity computer, a credential, where the credential is received from the authorizing entity computer via a sender computer operated by a sender in a message; transmitting, from the processing network computer to the authorizing entity computer, a credential identifier associated with the credential; receiving, by the processing network computer from the authorizing entity computer, the credential identifier; initiating provisioning of a token corresponding to the credential to a storage application on the recipient computer; and transmitting, by the processing network computer to the authorizing entity computer, a notification that the token is active in the storage application on the recipient computer.

These and other embodiments are described in further detail below.

DETAILED DESCRIPTION

Figure 1:
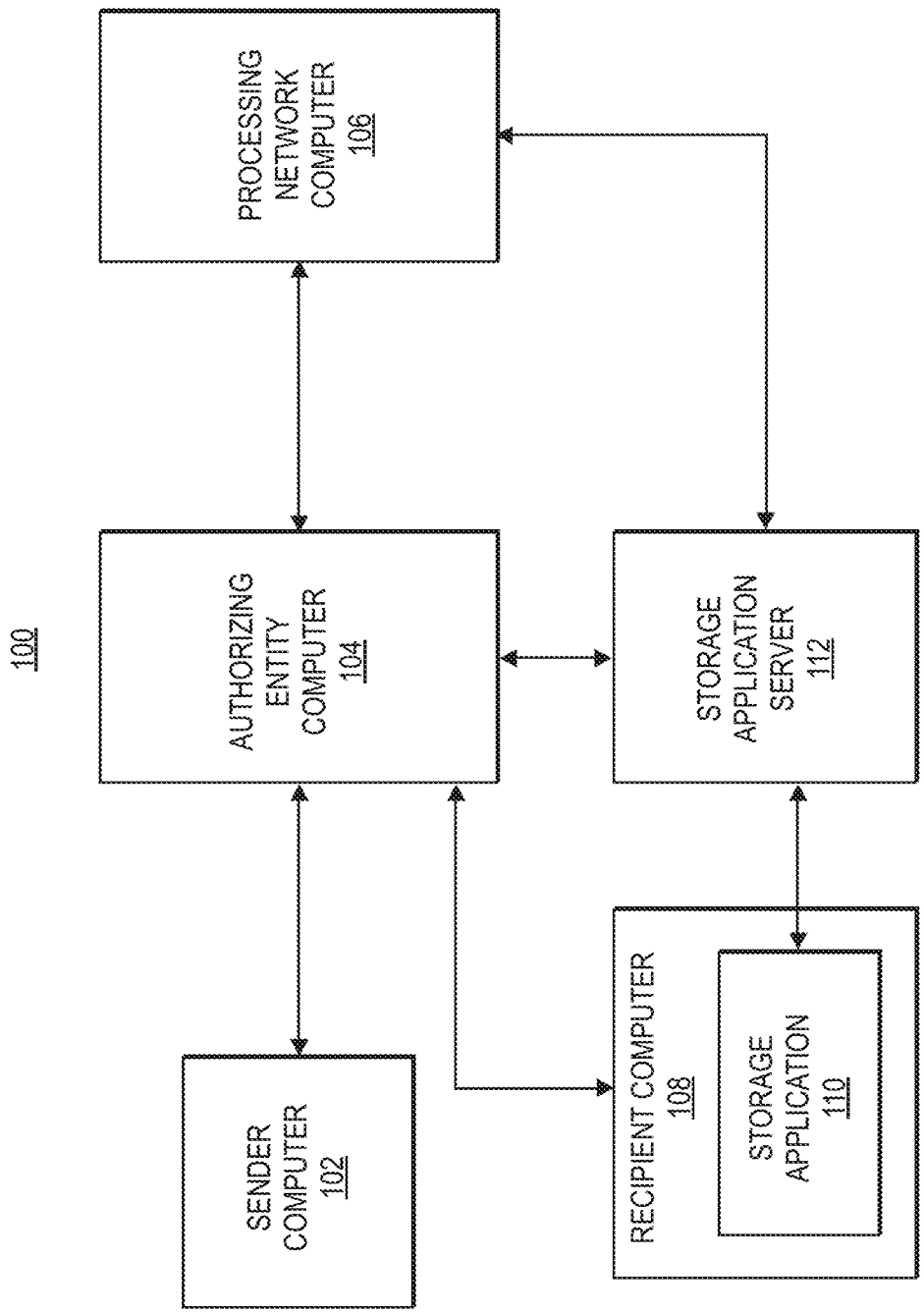
FIG. 1 is a block diagram illustrating an example system according to an embodiment.

Prior to discussing the details of some embodiments of the present disclosure, description of some terms may be helpful in understanding the various embodiments.

A "user" may include an individual or a computational device. In some embodiments, a user may be associated with one or more personal accounts and/or mobile devices. In some embodiments, the user may be a cardholder, account holder, or consumer.

A "communication device" (sometimes referred to as a mobile communication device or mobile device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g., cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "token" may be a substitute value for a credential. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that that services tokens. In some embodiments, a token service computer can facilitate requesting, determining (e.g., generating) and/or issuing tokens, as well as maintaining an established mapping of tokens to primary account numbers (PANs) in a repository (e.g. token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service computer that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile communication device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a payment token, mobile communication device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a user device (or payment device) or payment account. The authorization request message may include an issuer account identifier that may be associated with a user device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "user device" may include any suitable device that may be used to conduct a financial transaction, such as to provide payment credentials to a merchant. The user device may be a software object, a hardware object, or a physical object. As examples of physical objects, the user device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A user device may be associated with a value such as a monetary value, a discount, or store credit, and a user device may be associated with an entity such as a bank, a merchant, a payment processing network, or a person. A user device may be used to make a payment transaction. Suitable user devices can be hand-held and compact so that they can fit into a user's wallet and/or pocket (e.g., pocket-sized). Example user devices may include smart cards, magnetic stripe cards, keychain devices (such as the Speedpass™ commercially available from Exxon-Mobil Corp.), etc. Other examples of mobile communication devices include pagers, payment cards, security cards, access cards, smart media, transponders, and the like. If the user device is in the form of a debit, credit, or smartcard, the user device may also optionally have features such as magnetic stripes. Such devices can operate in either a contact or contactless mode. In some embodiments, a mobile communication device can function as a user device (e.g., a mobile communication device can store and be able to transmit payment credentials for a transaction).

An "application" may be computer code or other data stored on a computer readable medium (e.g. memory element or secure element) that may be executable by a processor to complete a task.

A "storage application" can include an electronic device that allows an individual to conduct electronic commerce transactions. A storage application (or digital wallet) may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A storage application may be designed to streamline the purchase and payment process. A storage application may allow the user to load one or more payment cards onto the digital wallet so as to make a payment without having to enter an account number or present a physical card.

A "storage application provider" may include an entity, such as an issuing bank or third party service provider, that issues a digital wallet to a user that enables the user to conduct financial transactions. A storage application provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A storage application provider may enable a user to access its account via a personal computer, mobile communication device or access device.

In many instances, a user device (or "payment device") can be associated with one or more individuals. For instance, an individual can be associated with a user device such that only the individual is authorized to initiate a transaction using the user device. The individual(s) authorized to use the user device can access user device details on a storage application. Such user device details may include a credential such as a primary account number for a credit or debit card account.

However, for any of a variety of reasons, an individual may want to temporarily provide access to another user to use the credential associated with the user device to initiate one or more transactions. As a first example, an individual may want to provide a family relative with access to the credential associated with the user device to initiate a specific type of transaction. As an illustration, the individual may want to provide another user such as a child of the individual with the ability to only initiate transactions relating to food/groceries for a specified time duration.

Embodiments of the invention can include the sharing of a credential associated with a user device with a recipient, thereby allowing the recipient to temporarily or permanently use the credential for transactions. The sender can specify a recipient in which to share the credential and can set a variety of control parameters relating to the use of the user device by the recipient. Example control parameters can relate to a type of resources in which the recipient can purchase, time periods for purchases, transaction amount limits, etc.

FIG. 1 is a block diagram illustrating an example system 100 according to an embodiment. The system 100 can include a sender computer 102 in communication with an authorizing entity computer 104, which may be an issuer computer. The authorizing entity computer 104 may be in communication with a processing network computer 106 and a recipient computer 108, as well as a storage application computer 112. The storage application computer 112 may be a wallet server in some embodiments.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The sender computer 102 can include a mobile device (e.g., a mobile phone) operated by a sender. The sender computer 102 can include a storage application that can securely store credentials (e.g., tokens) for one or more user devices (e.g., payment devices). The sender computer 102 can include features as described with respect to communication device 500 in FIG. 5.

The authorizing entity computer 104 can include a computer (or series of interconnected computing instances) can be operated by an authorizing entity such as an issuer of the credential that is to be shared with a recipient of the recipient computer 108. The authorizing entity computer 104 can include features similar to authorizing entity computer 600 as described with respect to FIG. 6.

The processing network computer 106 can include a computer associated with a payment processing network. A payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet. The processing network computer 106 can include features as described with processing network computer 700 in FIG. 7.

The recipient computer 108 can be a mobile device (e.g., a mobile phone) associated with a recipient. The recipient computer 108 can include a storage application 110, which may be a wallet application.

The storage application server 112 can operate in conjunction with the storage application 110. In some embodiments, the storage application server 112 can be a wallet server computer.

Figure 2:
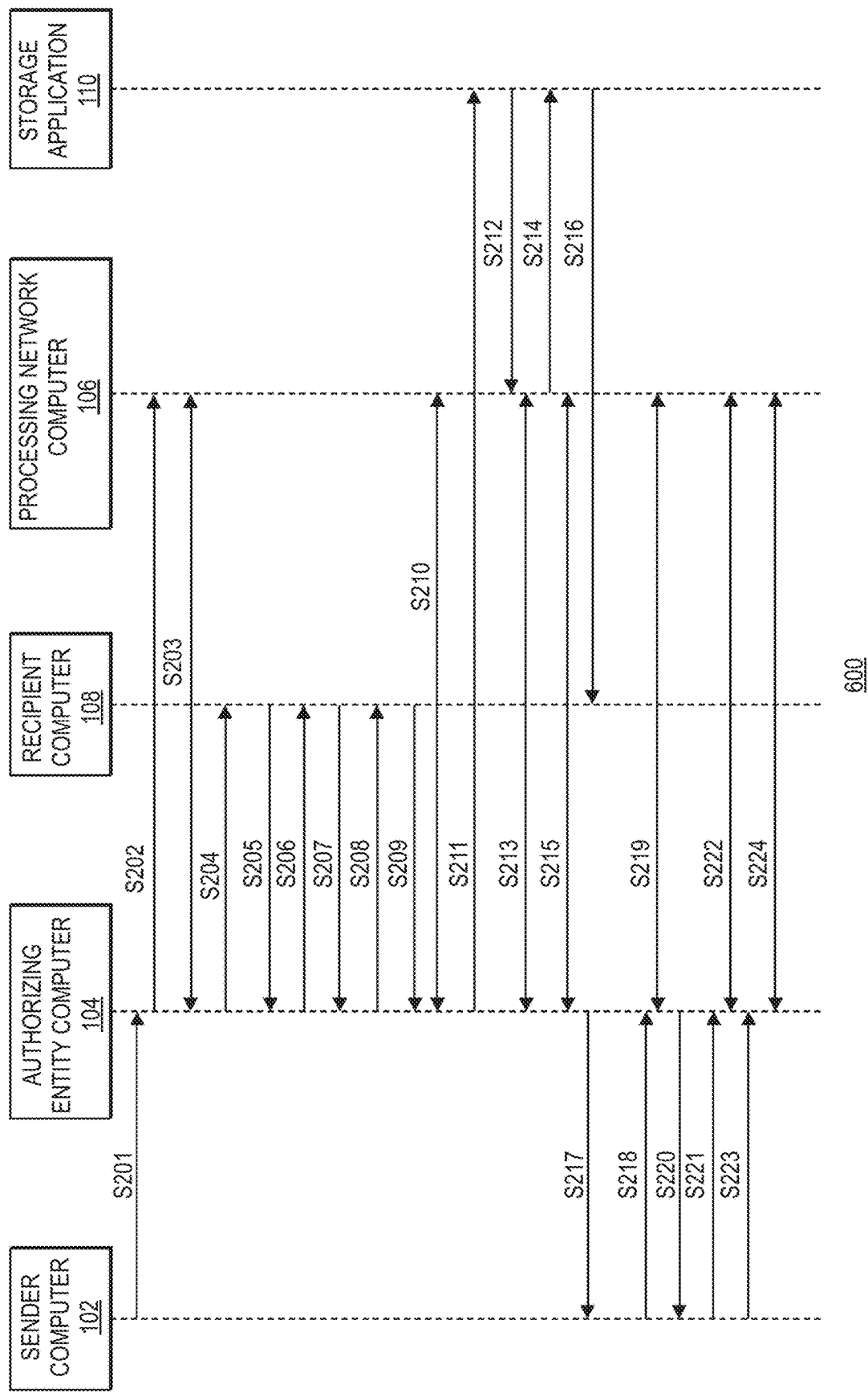
FIG. 2 shows process flow for sharing access data with a recipient according to an embodiment.

FIG. 2 illustrates a process according to an embodiment of the invention.

Figure 4A:
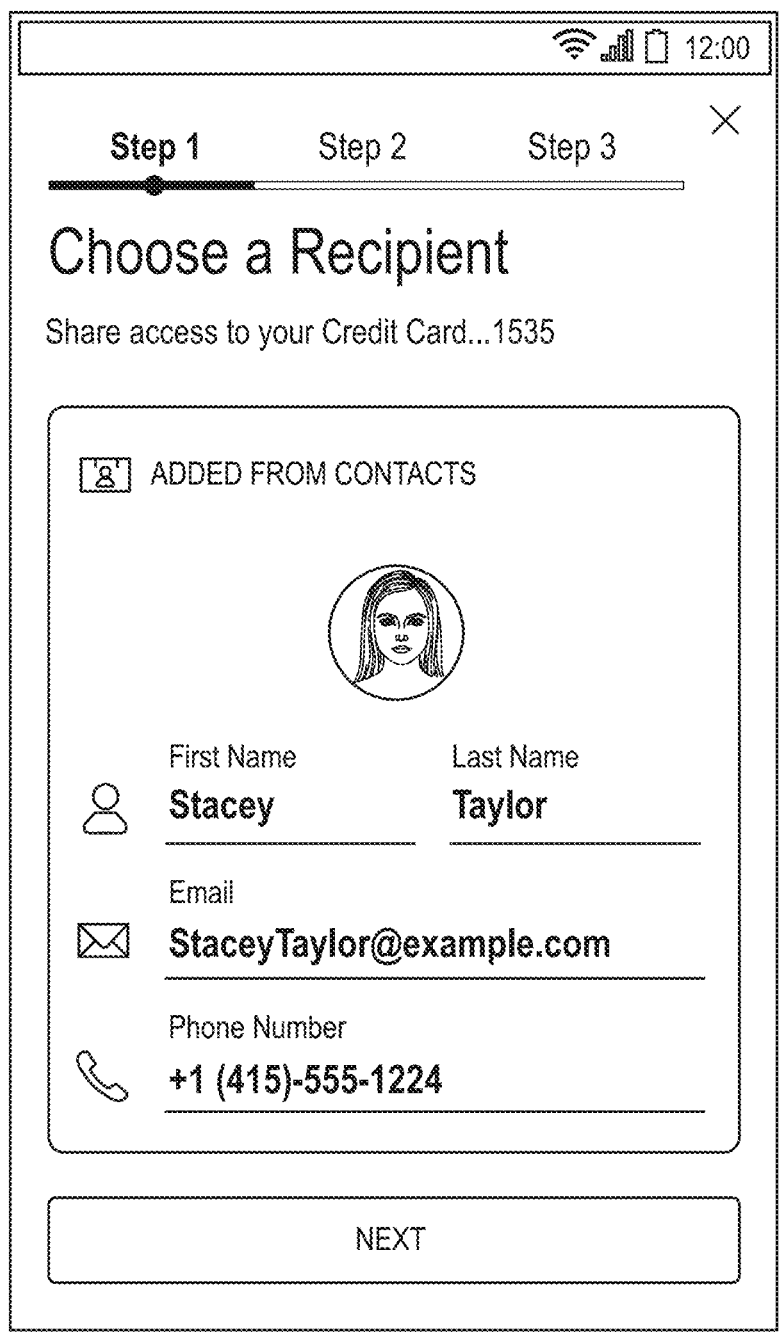
FIGS. 4A-4F shows user interfaces according to embodiments of the invention.

At S201, a sender operating a sender computer 102 can have an intend to allow a recipient operating a recipient computer 108 to use a credential associated with a user device of the sender. The sender computer 102 can transmit a request to share a credential for a specified user device with a recipient of the recipient computer 108 to an authorizing entity computer 104. The authorizing entity computer 104 may be operated by an issuer (e.g., a bank) that holds an account that is identified by the credential. The credential may be a PAN or primary account number. Illustratively, the sender operating the sender computer 102 can sign into an authorizing entity application (e.g., a mobile banking application) on the sender computer 102 and select a user device such as a credit card to be shared with the recipient operating the recipient computer 108. The request to share the credential can include details specifying the recipient, such as a recipient name, email address, phone number, device identifier, etc. An example interface that might be displayed by the sender computer 102 illustrating a selection of a recipient is shown in FIG. 4A.

Figure 4B:
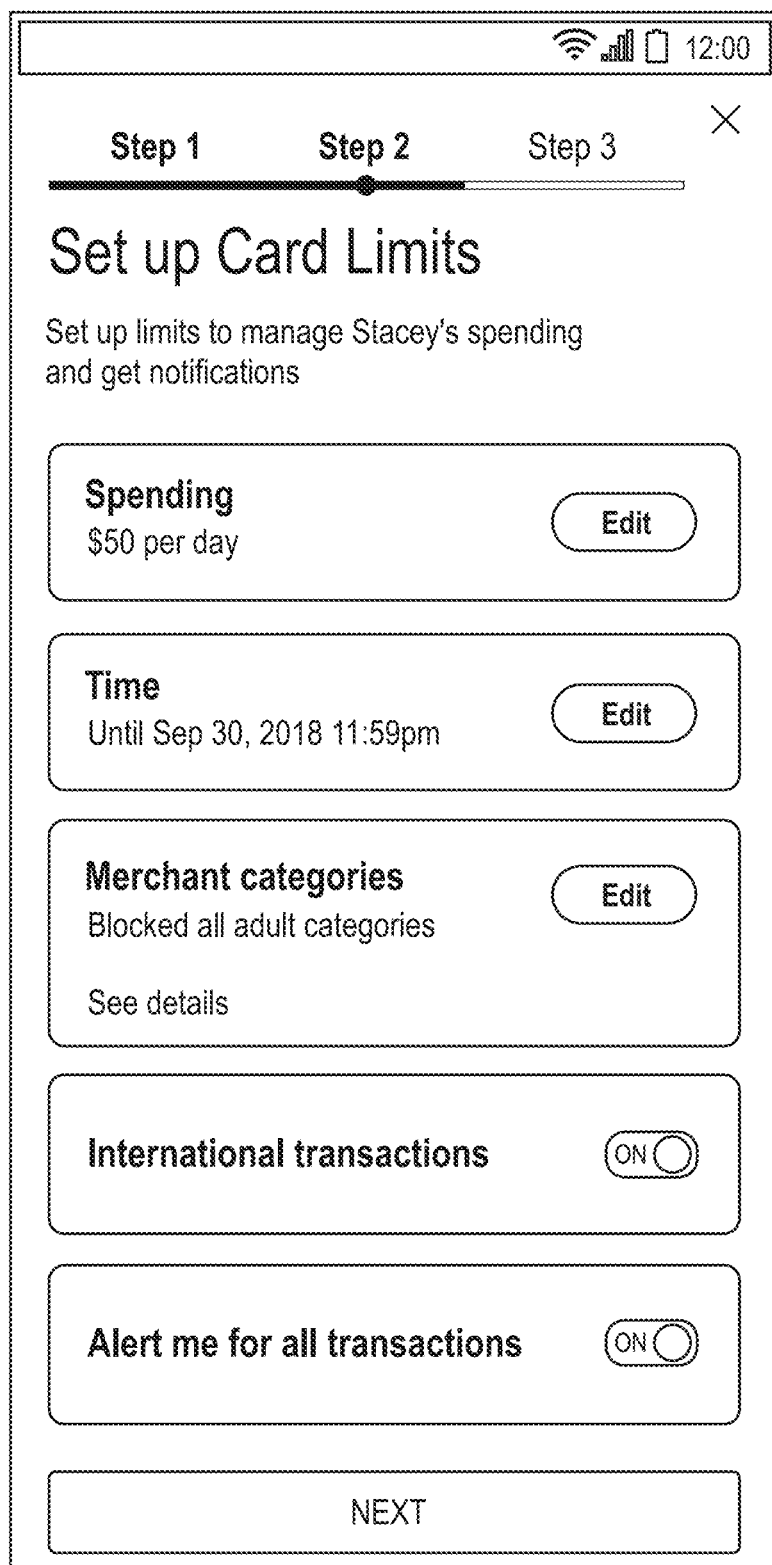

In some embodiments, the request to share the credential can include control data. Control data can include a series of parameters specifying conditions in which the recipient can use the credential associated with the user device to initiate transactions. For example, control data can restrict transactions conducted by the recipient to certain times, transaction amounts, resource providers (e.g., merchants), transaction types, etc. An example interface illustrating a selection of control parameters that may be displayed by the sender computer 102 is shown in FIG. 4B.

At S202, the authorizing entity computer 104 can send selected controls to a processing network computer 106 via a transaction controls API. The processing network computer 106 can return a template identifier for the controls. In some instances, after receiving the request from the sender computer 102, the authorizing entity computer 104 can save the control data (if it is present) selected by the sender along with data identifying the selected user device.

In step S203, the authorizing entity computer 104 can identify the credential such as a PAN selected by the sender, and can enroll the credential with the processing network computer 106 by transmitting the credential to the processing network computer 106. The transmission can occur through a Universal Card Enrollment API, or through any other communication mechanism. After receiving the credential, the processing network computer 106 can obtain a credential identifier based on the credential. The processing network computer 106 can provide the credential identifier to the authorizing entity computer 104 and the authorizing entity computer 104 can receive the credential identifier.

The credential identifier can include any suitable data string that identifiers the credential, but is not the credential itself. In some embodiments, the credential identifier can uniquely identify the credential, but only the processing network computer 106 may include a mapping of the credential identifier with the corresponding credential. The credential identifier preferably does not include any private information (e.g., personally identifiable information (PII)).

At S204, after receiving the credential identifier, the authorizing entity computer 104 can store it in association with the credential, and can transmit a notification to the recipient computer 108 with a link such as a uniform resource locator (URL) to bind the credential identifier with the recipient. The notification can be transmitted via an email or text message as specified by the sender. The recipient, via recipient computer 108, can select the URL to initiate a verification process to verify the recipient computer 108 and bind the recipient computer 108 (and the storage application 110 executing on the recipient computer 108) to the selected user device. The notification can also specify an expiration time for the recipient to select the URL. An example interface on a sender computer 102 specifying a recipient in which an invitation has been sent is shown with respect to FIG. 4C.

At S205, the recipient, via recipient computer 108, can download or open the storage application 110 as directed by the URL. The recipient can perform a verification process with the authorizing entity computer 104.

At S206, the authorizing entity computer 104 can verify the integrity of the URL selected by the recipient. For example, the authorizing entity computer 104 can determine that the recipient has selected the URL and can retrieve information relating to the recipient computer 108 (e.g., recipient computer identifier, network address).

The authorizing entity computer 104 may then generate a multifactor authentication request to verify the recipient. The multifactor authentication request can request a password, a biometric authentication of the recipient, a one-time passcode (e.g., sent via email, text) to verify the recipient. An example interface on a recipient computer 108 illustrating a multi-factor authentication request provided to the recipient is shown in FIG. 4D.

At S207, the recipient, via recipient computer 108, may provide a multifactor authentication response to the authorizing entity computer 104. The multifactor authentication response can provide a response to multifactor authentication request, such as a requested passcode) from the recipient. In some embodiments, the recipient opens the storage application on the recipient computer 108 and enters the one-time passcode into the storage application. The authorizing entity computer 104 can then match the multifactor authentication response to verify the recipient. An example interface on a recipient computer 108 illustrating a multi-factor authentication response provided by the recipient is provided with respect to FIG. 4E.

At S208, the authorizing entity computer 104 can associate the credential identifier with the credential (e.g., the PAN of the user device). This can be performed responsive to verifying the recipient as described with respect to S207. The authorizing entity computer 104 can transmit a request to the recipient computer 108 to display data relating to the user device to the storage application 110 on the recipient computer 108.

At S209, the recipient, on the storage application 110 on the recipient computer 108, can select to push the user device to the storage application. For example, the storage application 110 can display a "push to pay" button that can be selected by the recipient on the storage application 110. The recipient computer 108 can provide a notification to the authorizing entity computer 104 that the recipient has selected the user device on the storage application 110.

At S210, the authorizing entity computer 104 can call an in-app provisioning API with the credential identifier and the template identifier to the processing network computer 106. The authorizing entity computer 104 can request an encrypted data payload from the processing network computer 106. For instance, the authorizing entity computer 104 can provide the credential identifier to a provisioning API, and the processing network computer 106 can return the encrypted data payload (e.g., an encrypted PAN). The encrypted data payload can include the credential for the user device that is encrypted using a key known only to the processing network computer 106.

In this embodiment, the return of the encrypted payload by the processing network computer 106 to the authorizing entity computer 104 can be an example of the processing network initiating the provisioning of a token to the storage application on the recipient computer 108. The following steps provide specific details on how that provisioning process can take place.

Note that the passage of the credential identifier in steps S203 and S210 between the processing network computer 106 and the authorizing entity computer 104 can advantageously preserve the security of the real credential, as the real credential does not need to be passed between these computers to facilitate the provisioning of the token.

At S211, the authorizing entity computer 104 can provide the encrypted data payload to the storage application 110 on the recipient computer 108.

At S212, the storage application 110 can send the encrypted data payload to the processing network computer 106. The transmission of the encrypted data payload can include request for a token specific to the credential associated with the user device that was selected. The token may be dynamically created or retrieved from a database by the processing network computer 106.

At S213, the processing network computer 106 can verify the obtained encrypted data payload from the storage application 110 and can activate or obtain the token after validation. The processing network computer 106 can verify the obtained encrypted data payload by decrypting the encrypted data payload and verifying with the authorizing entity computer 104 that the credential in the decrypted data payload matches the credential for the user device of the sender operating the sender computer 102.

The processing network computer 106 can generate or generate a token unique to both the credential for the user device and the storage application 110 executing on the recipient computer 108. The token can be provided by the storage application 110 for initiating a transaction as described herein.

At S214, the processing network computer 106 can transmit a notification to the storage application 110 with the token and indicating that the token is active. An example interface on a recipient computer 108 illustrating that the token is active is shown in FIG. 4F.

At S215, the processing network computer 106 can identify the created token and send the token and the template identifier to the authorizing entity computer 104 via a transaction controls API. The processing network computer 106 can return details relating to the token, such as the token, the user device and the recipient associated with the token. The processing network computer 106 can generate a mapping for the token and corresponding control data, and can store both in a database along with the credential. Thus, the processing network computer 106 can now have the token, the credential corresponding to the token, and control data associated with the token and the credential.

At S216, the recipient computer 108 may receive a confirmation message from the storage application 110 that the user device (or the token associated with the credential of the user device) is available for use. The recipient can initiate transactions using the token stored at the storage application 110 in the recipient computer 108.

At S217, the authorizing entity computer 104 can transmit a notification to the sender computer 102 indicating that the provisioning of the token was successful. For example, the authorizing entity computer 104 can cause display of a message (e.g., "Recipient's smartphone has added your card to Digital Wallet") on the sender computer 102.

In some instances, the sender can manage shared user devices by managing the control data for one or more shared user devices. At S218, the sender, via sender computer 102, can sign into an application associated with the authorizing entity computer 104 and selects a shared credential to be managed. The sender may choose to manage or edit shared access at any time through application associated with the authorizing entity computer 104.

At S219, the authorizing entity computer 104 can request the token details associated with the credential by calling the processing network computer 106 via the token inquiry API. The processing network computer 106, via the token inquiry API, can return all tokens associated with the credential. For example, the sender can associate the user device with multiple recipients, each recipient having unique control data associated with them. In this example, the processing network computer 106 can provide information detailing each recipient and control data corresponding to each recipient.

At S220, the authorizing entity computer 104 can cause display of a list of the tokens for the user device on the application associated with the authorizing entity computer 104 on the sender computer 102.

At S221, the sender, via application associated with the authorizing entity computer 104 on the sender computer 102, can select a first recipient to edit control data for the recipient.

At S222, the authorizing entity computer 104 can retrieve the existing controls on a token from the processing network computer 106. For example, the authorizing entity computer 104 can send a request for existing controls from a processing network computer 106 transaction controls API. The processing network computer 106 can provide the existing control data and transaction history data to the authorizing entity computer 104 via the transaction controls API.

At S223, the sender, via application associated with the authorizing entity computer 104 on the sender computer 102, can send a request to view details relating to the shared user device with a selected recipient.

At S224, the authorizing entity computer 104 can retrieve a transaction history for a token from the processing network computer 106. For example, the processing network computer 106 can identify transactions associated with a specified token and transmit the transaction history to the authorizing entity computer 104. The transaction history can be provided to the sender computer 102 for view by the sender.

Figure 3:
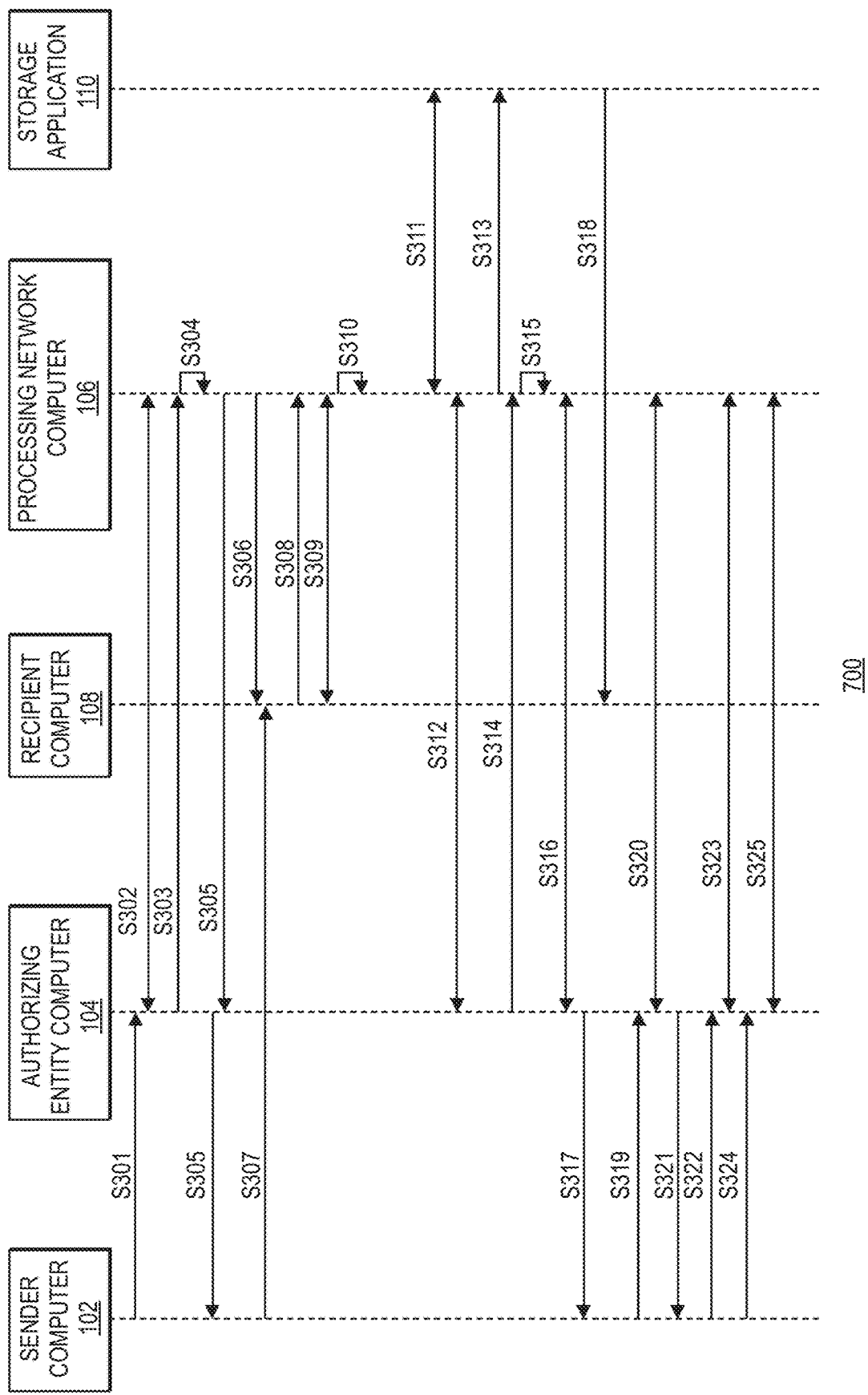
FIG. 3 shows a process flow according to another embodiment.

In some embodiments, the storage application 110 on a recipient computer 108 can include a provisioning software development kit (SDK). The provisioning SDK can interact with the processing network computer 106 to verify the recipient as described herein. FIG. 3 is a signaling process illustrating an example process flow for sharing a user device with a recipient computer comprising a provisioning SDK.

At S301, the sender, via an application associated with the associated entity computer 104 on the sender computer 102, can sign into an authorizing entity application on the sender computer 102 and decides to share a credential associated with a user device of the sender with the recipient of the recipient computer 108. the sender can select the recipient and sets control data on the usage of the user device to be shared. The sender can submit a message to the authorizing entity computer 104 providing details relating to the recipient, the credential and the control data.

At S302, the authorizing entity computer 104 can save the control data selected by the sender. The authorizing entity computer 104 can store control data for each user device and each sender at a storage module at the authorizing entity computer 104. The authorizing entity computer 104 can enroll a credential (e.g., a primary account number (PAN) for a user device) with processing network computer 106. The processing network computer 106 can obtain the credential and generate a credential identifier based on the credential. The processing network computer 106 can provide the credential identifier to the authorizing entity computer 104.

At S303, the authorizing entity computer 104 can provide any control data and the credential identifier to the processing network computer 106.

In this embodiment, after the credential identifier is received by the processing network computer 106, processing network computer 106 can initiate the provisioning of a token to the storage application on the recipient computer 108. The following steps provide specific details on how that provisioning process can take place.

At S304, the processing network computer 106 can store obtained data including the credential identifier, the control data, and the credential with a request ID and can generate a one-time password (OTP) for the request ID. At least a first and second portion of the OTP can then be generated by the processing network computer 106.

At S305, the processing network computer 106 can send the request identifier and the first portion of the OTP to be used as a shared secret with the recipient, to the authorizing entity computer 104. The authorizing entity computer 104 may display the first portion of the OTP shared secret to the sender computer 102.

At S306, the processing network computer 106 can send a notification to the recipient computer 108 (e.g., through email) with the second portion of the OTP and a link to the provisioning SDK on the storage application 110 on the recipient computer 108.

At S307, the sender computer 102 can shares the first portion of the shared secret with the recipient computer 108. For example, the first portion of the shared secret can be shared via email or text.

At S308, the recipient computer 108 may download and/or open the storage application 110 with the provisioning SDK.

At S309, the storage application 110 with the provisioning SDK may generate a multifactor authentication request (e.g., password/PIN, biometric, one-time passcode) to verify the identity of the recipient. The recipient may provide both received portions of the OTP to the processing network computer 106 to verify the recipient.

At S310, the processing network computer 106 verifies the portions of the OTP to verify the recipient. The processing network computer 106 can then retrieve the credential identifier and associate the credential identifier with the credential. The storage application 110 with the provisioning SDK can also interact with the processing network computer 106 to identify a credential's eligibility to be shared as described herein. The storage application 110 with the provisioning SDK can interact with the processing network computer 106 to obtain the encrypted data payload (e.g., an encrypted credential such as an encrypted PAN).

At S311, the processing network computer 106 can provide the encrypted credential to the storage application 110 on the recipient computer 108 via the provisioning SDK. The storage application 110 can then send the encrypted credential to the processing network computer 106 as part of a request for creating the token.

At S312, a token service associated with the processing network computer 106 can verify the recipient with the authorizing entity computer 104. Further, the processing network computer 106 can generate the token unique to the recipient and the credential for the user device to be shared.

At S313, the processing network computer 106 can transmit a message to the storage application 110 indicating that the token is active. The message can include the generated token.

At S314, the authorizing entity computer 104 may send the processing network computer 106 the credential identifier and a token reference identifier. In some instances, the control data for the credential can be transmitted with the credential identifier and a token reference identifier. The processing network computer 106 can store the obtained data with the token for use in approval of transactions initiated using the generated token.

At S315, the processing network computer 106 can request the token details by calling a token inquiry API with the token reference identifier. The processing network computer 106 can then send the token value and saved control data to a transaction control API to map the control data to the token.

At S316, the processing network computer 106 can send the token details to the authorizing entity computer 104. The sent token details can specify a confirmation that the control data has been successfully set on the respective token.

At S317, the authorizing entity computer 104 may send a success notification to the sender computer 102 using the token details. For example, the success notification can cause display of "Recipient's smartphone added your card to Digital Wallet" on the sender computer 102.

At S318, the recipient computer 108 may receive a confirmation message from the storage application 110 that the user device is available for use by the recipient.

In some instances, the sender can manage shared user devices by managing the control data for one or more shared user devices. At S319, the sender, via sender computer 102, can sign into an application associated with the authorizing entity computer 104 and selects a shared credential to be managed. The sender may choose to manage or edit shared access at any time through application associated with the authorizing entity computer 104.

At S320, the authorizing entity computer 104 can request the token details associated with the credential by calling the processing network computer 106 via the token inquiry API. The processing network computer 106, via the token inquiry API, can return all tokens associated with the credential. For example, the sender can associate the user device with multiple recipients, each recipient comprising unique control data. In this example, the processing network computer 106 can provide information detailing each recipient and control data corresponding to each recipient.

At S321, the authorizing entity computer 104 can cause display of a list of the tokens for the user device on the application associated with the authorizing entity computer 104 on the sender computer 102. In some instances, the authorizing entity computer can share multiple credentials relating to the sender to one or more recipient computers At S322, the sender, via application associated with the authorizing entity computer 104 on the sender computer 102, can select a first recipient to edit control data for the recipient.

At S323, the authorizing entity computer 104 can retrieve the existing controls on a token from the processing network computer 106. For example, the authorizing entity computer 104 can send a request for existing controls from a processing network computer 106 transaction controls API. The processing network computer 106 can provide the existing control data and transaction history data to the authorizing entity computer 104 via the transaction controls API.

At S324, the sender, via application associated with the authorizing entity computer 104 on the sender computer 102, can send a request to view details relating to the shared user device with a selected recipient.

At S325, the authorizing entity computer 104 can retrieve a transaction history for a token from the processing network computer 106. For example, the processing network computer 106 can identify transactions associated with a specified token and transmit the transaction history to the authorizing entity computer 104. The transaction history can be provided to the sender computer 102 for view by the sender.

As described herein, any of the sender computer and/or recipient computer can display data relating to various applications (e.g., application associated with the authorizing entity computer, storage applications). For example, the sender can interact with an application associated with the authorizing entity computer on the sender computer to send a request to share a credential for a user device (e.g., as described with respect to S201). As another example, the recipient can interact with the recipient computer to verify the recipient (e.g., as described with respect to S205-S209). FIGS. 4A-4F illustrate example user interfaces for sharing a credential with a recipient.

FIG. 4A shows an example user interface on a sender computer for selecting a recipient to share a credential for a user device. As noted above, the sender can interact with an application associated with the authorizing entity computer to select a user device and a recipient to share a credential for the user device. On the interface, the sender can provide details relating to the recipient, such as a recipient name, email address, phone number, etc. The authorizing entity computer can obtain data according to various regulations (e.g., Know Your Customer (KYC) and regional regulations). The contact information relating to the recipient can be utilized in sending messages to the recipient or performing a multi-factor authentication of the recipient as described herein.

FIG. 4B shows an example user interface on a sender computer for specifying control data parameters for sharing a credential for a user device. As shown in FIG. 4B, a sender can specify various parameters for use of the credential by the recipient, such as a transaction limit for a day, a time for initiating transactions, resource or resource provider categories, whether international transactions are allowed, an opt in for an alert when a transaction is made, etc. The controls and alerts selected by the account owner may be stored by the authorizing entity and provided to the processing network responsive to the token being generated. A processing network may set the controls on the token after it is provisioned in the recipient storage application.

Figure 4C:
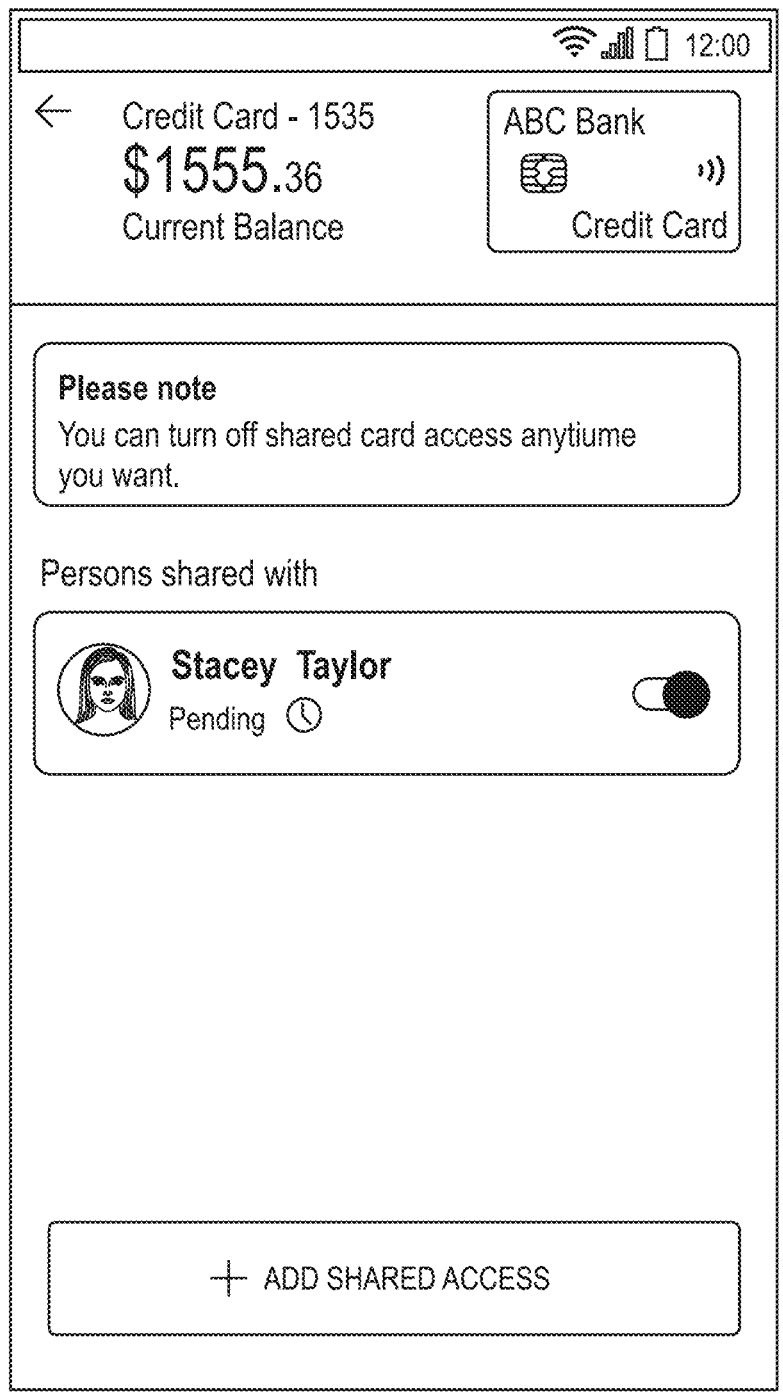
Figure 4D:
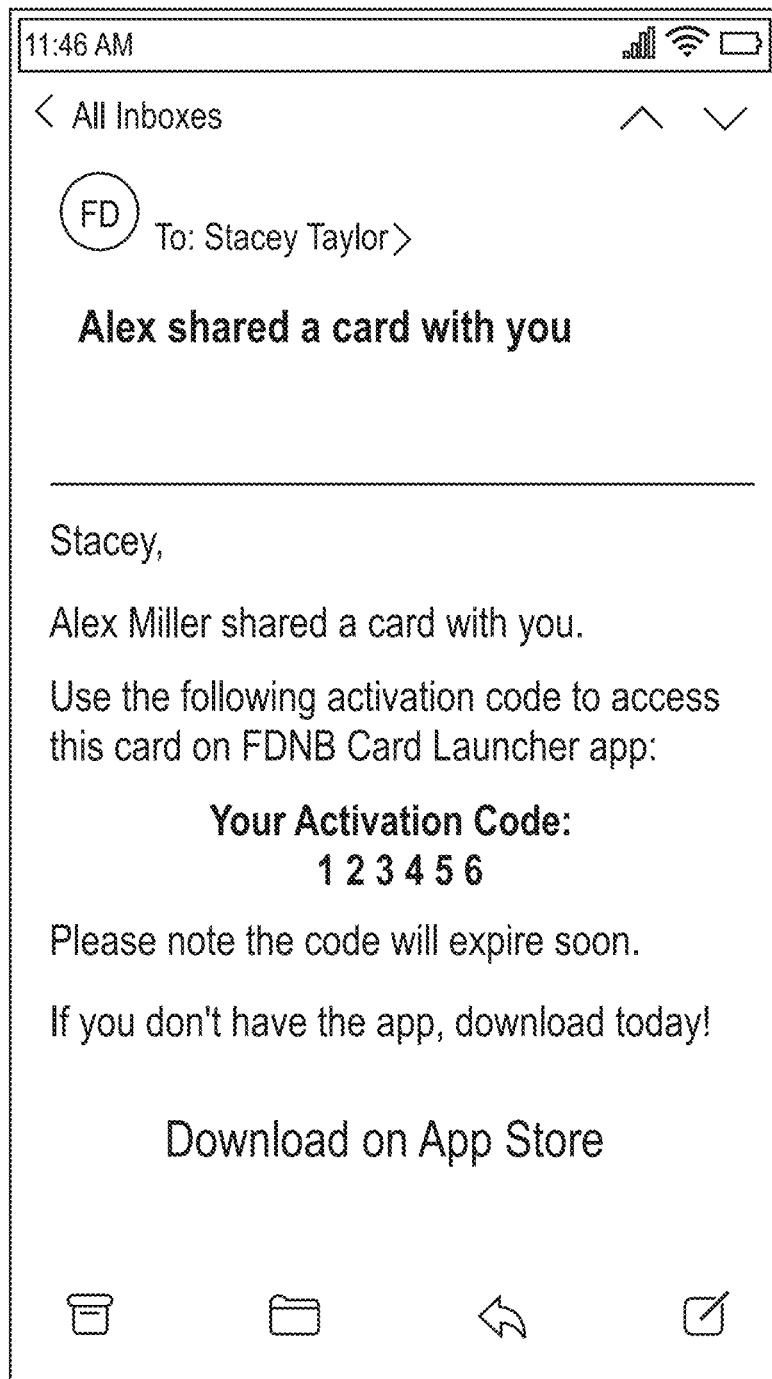

FIG. 4C shows an example user interface on a sender computer identifying that an invitation to share the credential has been sent to the recipient. The invitation may be sent to the recipient using the provided contact information. A list may also be displayed, showing the status of all recipients linked with the selected user device. The authorizing entity can receive a credential identifier when they enroll the credential with the processing network. The credential identifier will can embed into a link in the invitation sent to the recipient. A verification code may be generated for the account owner to provide to the recipient.

FIG. 4D shows an example user interface on a recipient computer obtaining an invitation to share the credential of the user device. As shown in FIG. 4D, the recipient can access the invitation via an email application on the recipient computer. A one-time passcode may be included for the recipient to validate the recipient's identity. The invitation may also include a link to route the recipient to the authorizing entity application to complete the verification process. In some instances, the recipient may not need to create an account for the authorizing entity application.

Figure 4E:
Figure 4F:
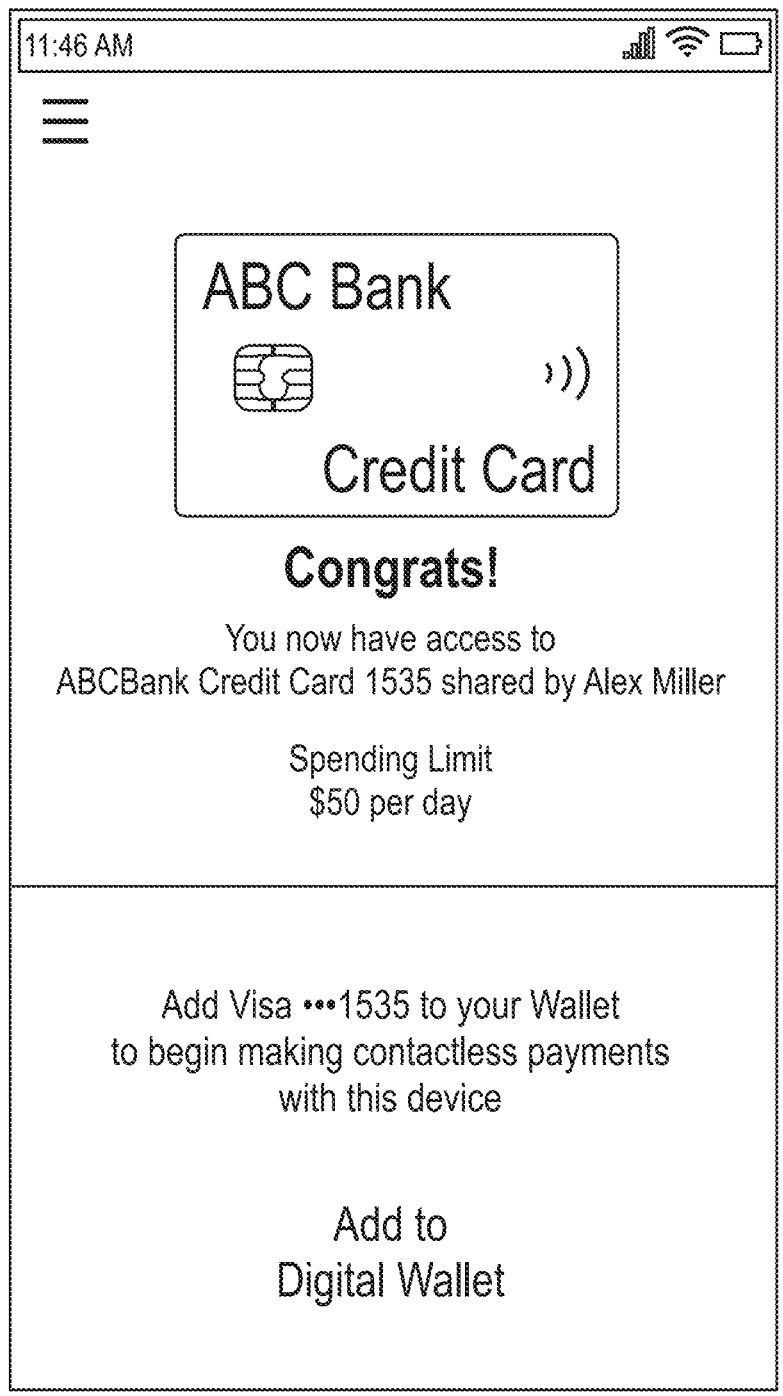

FIG. 4E shows an example user interface on a recipient computer verifying the recipient using a multi-factor authentication message. For instance, the recipient on the recipient computer can provide a verification code (e.g., a multi-factor authentication code provided via email) to verify the identity of the recipient. In some instances, the recipient can provide other identifying information, such as a recipient name or phone number for verification of the recipient's identity.

FIG. 4F shows an example user interface on a recipient computer indicating a successful verification. A storage application on the recipient computer may show one or more parameters for the control data for the user device. The storage application on the recipient computer may also include a link to provision the user device to the storage application to initiate a transaction on the storage application on the recipient computer using a token obtained from a processing network computer.

Figure 5:
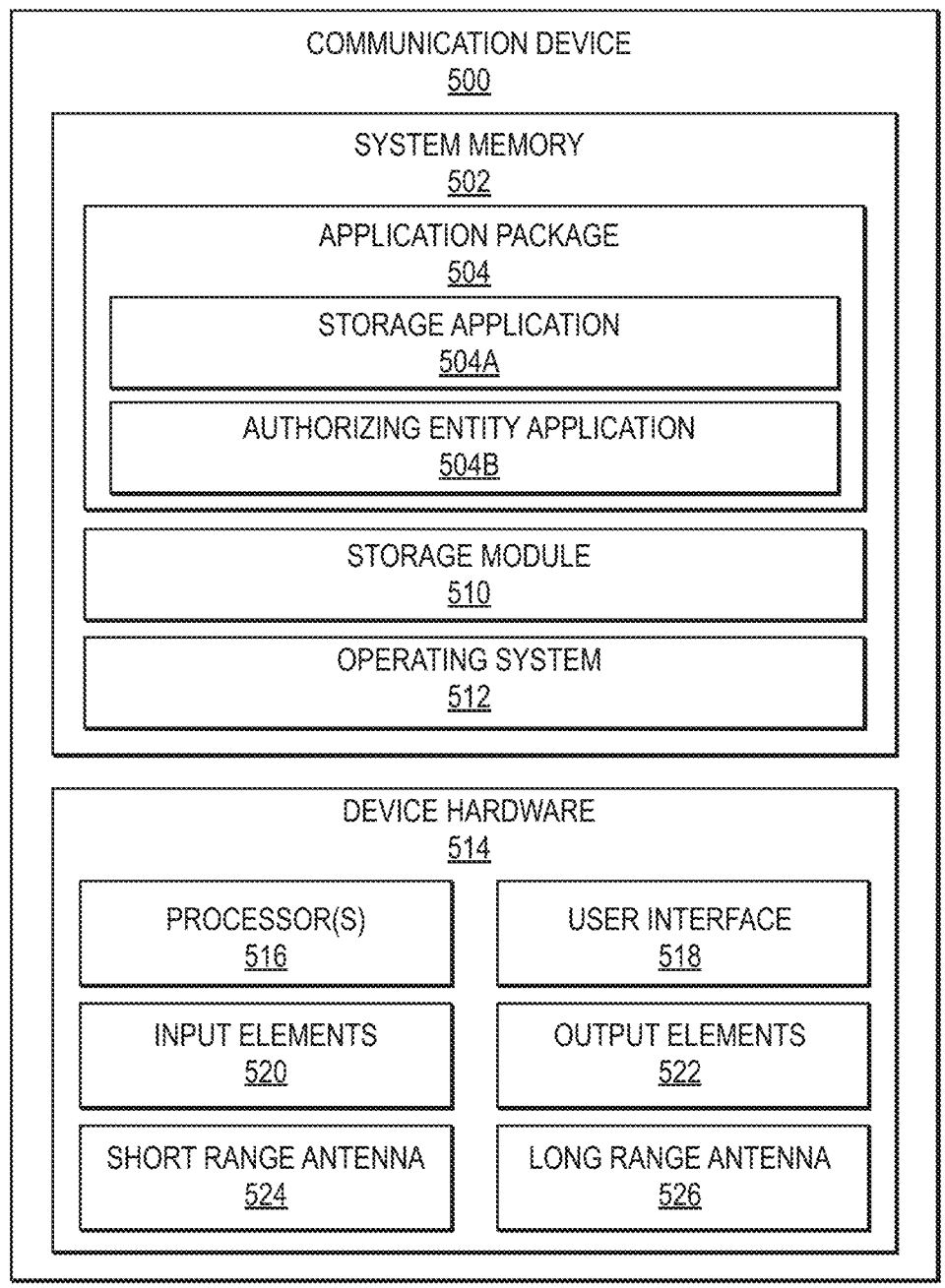
FIG. 5 is a block diagram illustrating an example communication device according to an embodiment.

FIG. 5 is a block diagram illustrating an example communication device 500. The communication device 500 can include a mobile device (e.g., mobile phone) executing a mobile application (e.g., 504A) and is capable of performing processing tasks as described herein. The communication device 500 can include any of the sender computer 102 and/or the recipient computer 108 as described with respect to FIG. 1. The communication device 500 may include device hardware 514 coupled to a system memory 502. The communication device 500 can be an example of the sender device 102 or the recipient device 108 in FIGS. 1-3.

Device hardware 514 may include a processor 516, a short range antenna 524, a long range antenna 526, input elements 520, a user interface 518, and output elements 522 (which may be part of the user interface 518). Examples of input elements may include microphones, keypads, touchscreens, sensors, etc. Examples of output elements may include speakers, display screens, and tactile devices. The processor 516 can be implemented as one or more integrated circuits (e.g., one or more single core or multicore microprocessors and/or microcontrollers), and is used to control the operation of communication device 500. The processor 516 can execute a variety of programs in response to program code or computer-readable code stored in the system memory 502, and can maintain multiple concurrently executing programs or processes.

The long range antenna 526 may include one or more RF transceivers and/or connectors that can be used by communication device 500 to communicate with other devices and/or to connect with external networks. The user interface 518 can include any combination of input and output elements to allow a user to interact with and invoke the functionalities of communication device 500. The short range antenna 524 may be configured to communicate with external entities through a short range communication medium (e.g. using Bluetooth, Wi-Fi, infrared, NFC, etc.). The long range antenna 526 may be configured to communicate with a remote base station and a remote cellular or data network, over the air.

The system memory 502 can be implemented using any combination of any number of non-volatile memories (e.g., flash memory) and volatile memories (e.g. DRAM, SRAM), or any other non-transitory storage medium, or a combination thereof media. The system memory 502 may store computer code, executable by the processor 805, for performing any of the functions described herein. For example, the system memory 502 may comprise a computer readable medium comprising code, executable by the processor 516, for implementing a method as described herein.

The system memory 502 may also store applications 504 that can include a storage application 504A. The storage application 504A can include a digital wallet application that can store/access credentials relating to one or user devices or initiate a transaction as discussed herein. For instance, a storage application 504A associated with a sender can allow for sharing of a credential for a user device to one or more recipients. As another example, the storage application 504A can store a token for the user device and can initiate a transaction including the token.

The system memory 502 may also store an authorizing entity application 504B. The authorizing entity application 504B can include an application associated with an authorizing entity (e.g., an issuer of a user device). Particularly, the authorizing entity application 504B can interact with an authorizing entity computer (e.g., 104) to perform processes as described herein.

Further, the user can view and modify aspects of one or more user devices via the authorizing entity application 504B. For instance, the user can access the authorizing entity application 504B on the communication device 500 to view details relating to one or more user devices and/or a transaction history for each user device. The authorizing entity can interact with the sender and receiver via the authorizing entity application 504B on the communication device.

Figure 6:
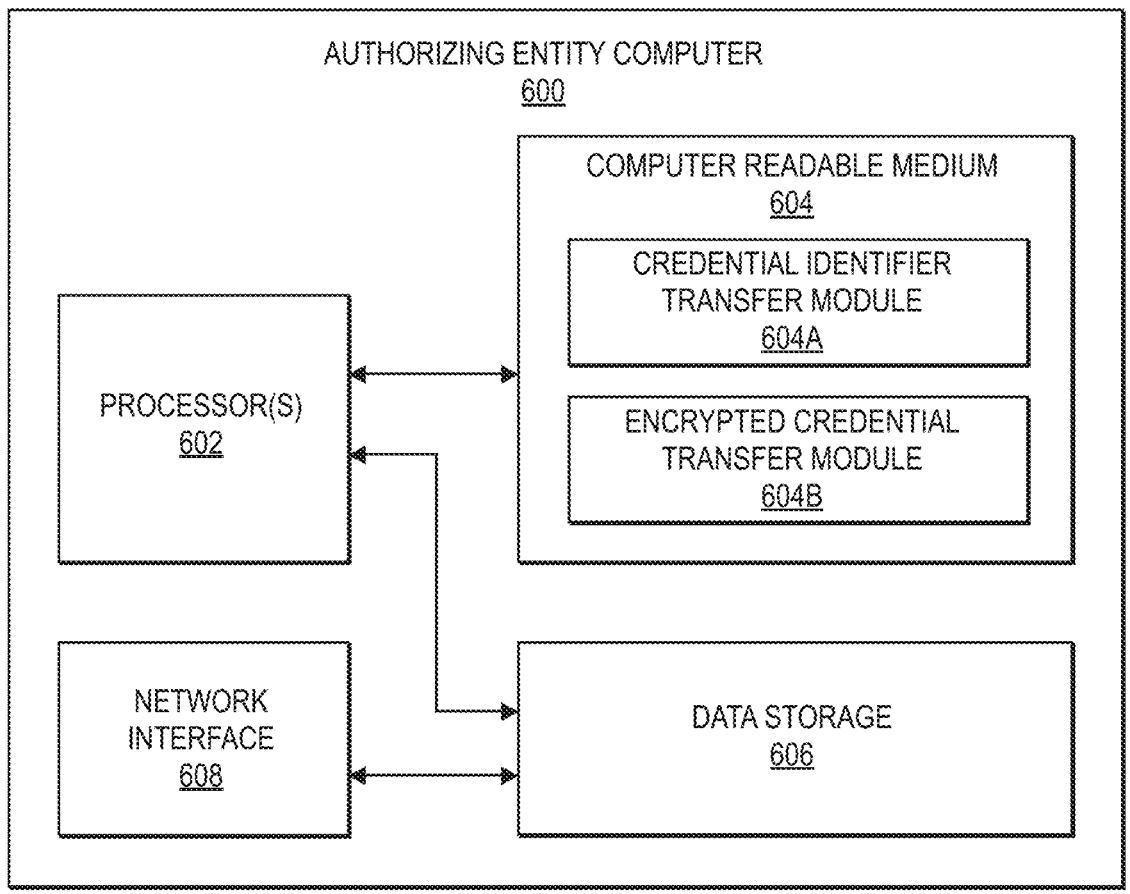
FIG. 6 shows an example authorizing entity computer according to an embodiment.

FIG. 6 shows an example authorizing entity computer 600 according to an embodiment. The authorizing entity computer 600 can include a server (or series of interconnected servers) with features similar to authorizing entity computer 104 as described with respect to FIG. 1. For instance, the authorizing entity computer 600 can obtain a request to share a credential between a sender computer and a recipient computer, forward a credential identifier from a processing network computer, and forward an encrypted credential between the processing network computer and a recipient computer as described herein. The authorizing entity computer 600 can include a processor 602 and a computer readable medium 604, a data storage module 606, and a network interface 608 coupled to the processor 602.

The computer readable medium 604 may comprise a credential identifier transfer module 604A. The credential identifier transfer module 604A can include instructions to obtain a credential identifier from a processing network responsive to receiving a request to share a credential between a sender and a recipient. The credential identifier can uniquely identify a credential (e.g., a PAN).

The computer readable medium 604 may comprise an encrypted credential transfer module 604B. The encrypted credential transfer module 604B can include instructions to obtain an encrypted credential from a processing network computer and forward the encrypted credential to the recipient computer. The encrypted credential can be encrypted such that only the processing network computer can decrypt the encrypted credential. The recipient computer can provide the encrypted credential to the processing network computer and receive a token from the processing network computer.

The computer readable medium 604 may comprise code executable by the processor for performing operations including: receiving a request from a sender computer operated by a sender to allow a recipient operating a recipient computer to use a credential of the sender; transmitting the credential to a processing network computer; receiving, from the processing network computer, a credential identifier associated with the credential; transmitting the credential identifier to the processing network computer, which thereafter initiates provisioning of a token corresponding to the credential to a storage application on the recipient computer; and receiving a notification that the token is active in the storage application on the recipient computer.

Figure 7:
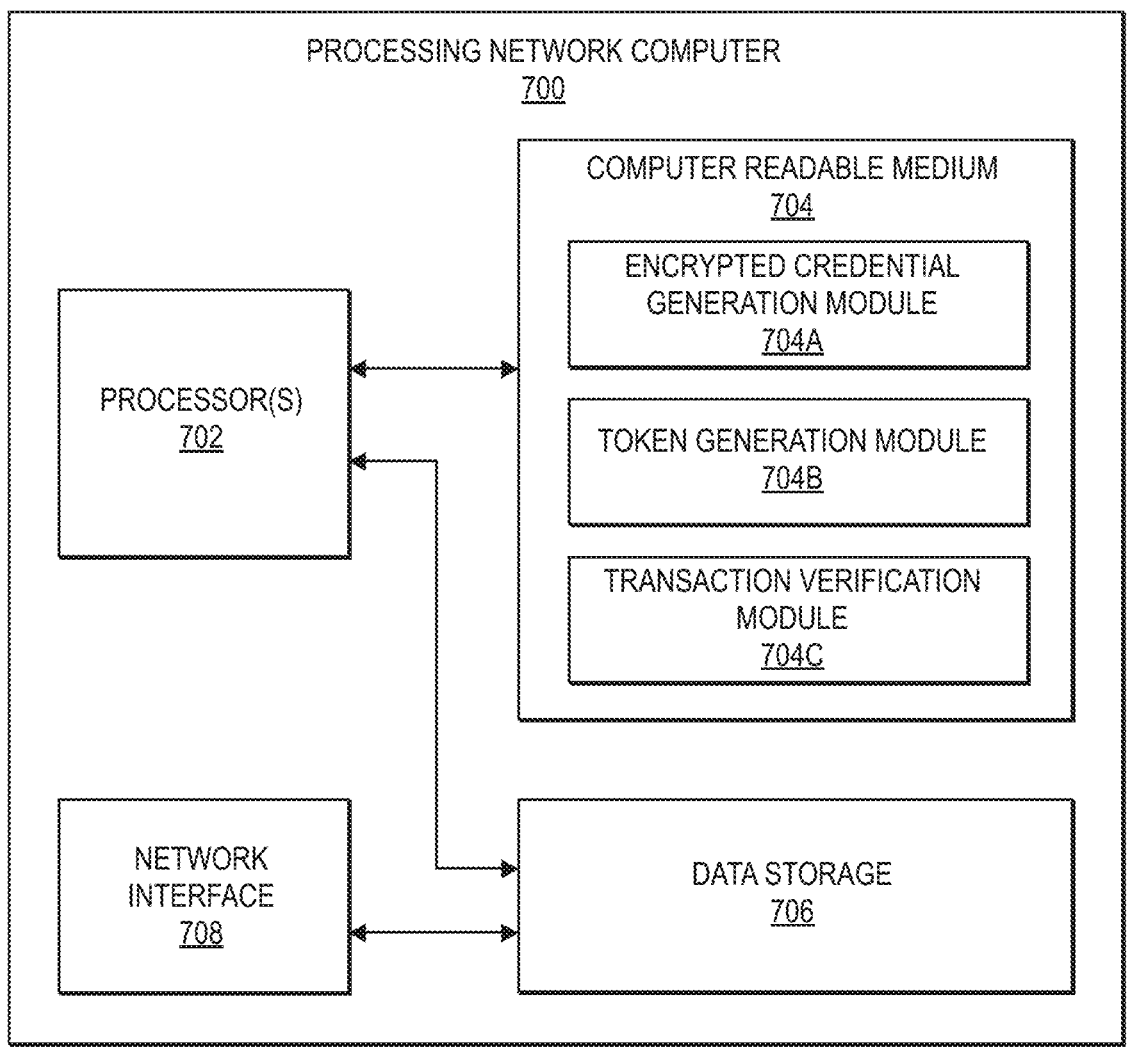
FIG. 7 shows an example processing network computer according to an embodiment.

FIG. 7 shows an example processing network computer 700 according to an embodiment. The processing network computer 700 can include a server (or series of interconnected servers) that includes features similar to processing network computer 106 as described with respect to FIG. 1. For instance, the processing network computer 700 can provide a credential identifier and/or an encrypted credential to the authorizing entity computer. The processing network computer 700 can also generate a token for a user device and provide the token to the recipient computer in response to receiving the encrypted credentials from the recipient computer. The processing network computer 700 can also verify that transactions initiated by the recipient computer are within control parameters specified by the sender computer. The processing network computer 700 can include a processor 702 and a computer readable medium 704, a data storage module 706, and a network interface 708 coupled to the processor 702. The data storage module 706 can store data relating to the sender computer, user device, and recipient computer, such as the control parameters for the user device, the token specific to the recipient computer, etc.

The computer readable medium 704 may comprise an encrypted credential generation module 704A. The encrypted credential generation module 704A can include instructions to generate an encrypted credential responsive to receiving the credential identifier from an authorizing entity computer. The encrypted credential can be encrypted using a key known only to the processing network computer 700 such that when the encrypted credential is received from a recipient computer, the processing network computer 700 can decrypt the encrypted credential.

The computer readable medium 704 may comprise a token generation module 704B. The token generation module 704B can include instructions to generate a token in response to receiving the encrypted credential from a recipient computer and verifying the encrypted credential (e.g., decrypting the encrypted credential using a key). The token can be specific to the user device and the recipient computer. The token can be included in an authorization request message to initiate a transaction by the recipient computer.

The computer readable medium 704 may comprise a transaction verification module 704C. The transaction verification module 704C can include instructions to verify a transaction initiated by the recipient computer. Verifying the transaction can include verifying the token included in the authorization request message and/or determining that the transaction is within the control parameters. For example, the transaction verification module 704C can determine whether a transaction amount is less than a maximum transaction amount for the user device or determine whether a resource type associated with the transaction is allowed in the controlled parameters. Responsive to the transaction being outside the control parameters for the user device, the processing network computer 700 can reject the transaction.

The computer readable medium 704 may comprise code, executable by the processor, for performing operations including: receiving, by the processing network computer from an authorizing entity computer, a credential, where the credential is received from the authorizing entity computer via a sender computer operated by a sender in a message; transmitting, from the processing network computer to the authorizing entity computer, a credential identifier associated with the credential; receiving, by the processing network computer from the authorizing entity computer, the credential identifier; initiating provisioning of a token corresponding to the credential to a storage application on the recipient computer; and transmitting, by the processing network computer to the authorizing entity computer, a notification that the token is active in the storage application on the recipient computer.

Figure 8:
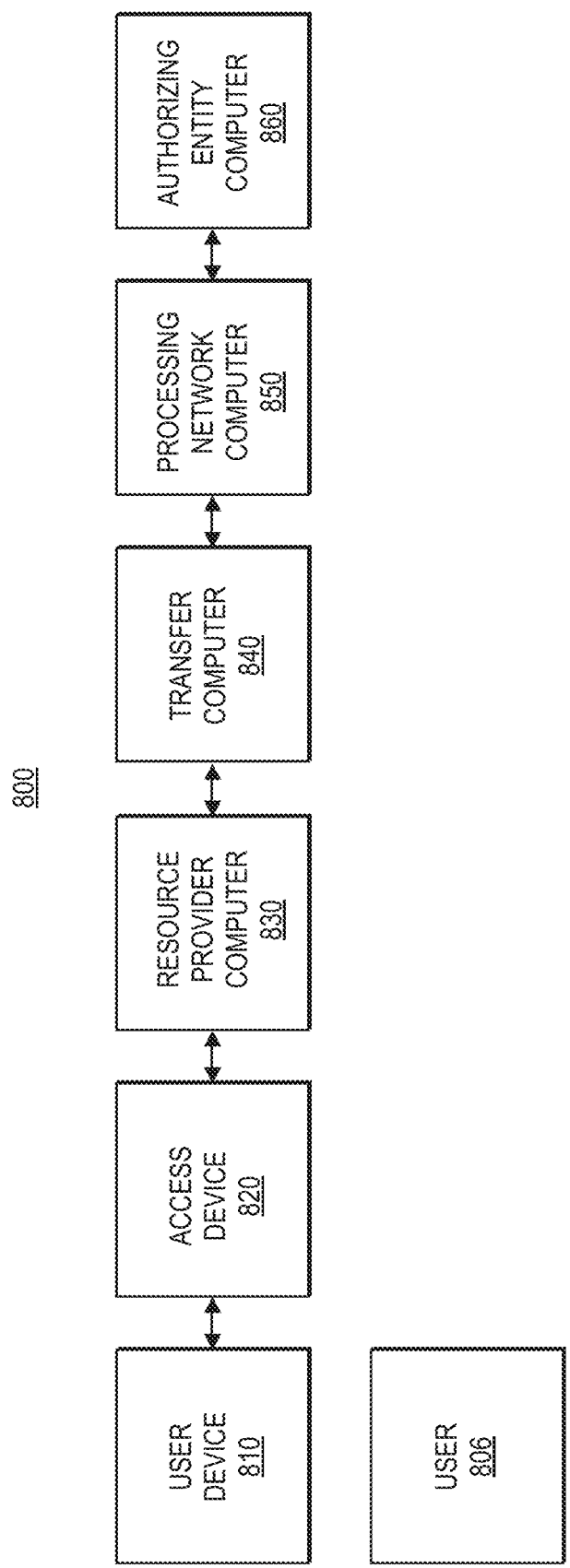
FIG. 8 shows a block diagram of a transaction processing system that can use a user device with access data (e.g., a token) according to an embodiment.

FIG. 8 shows a block diagram of a transaction processing system 800 that can use a user device with access data (e.g., a token) according to an embodiment. FIG. 8 shows a user 806 that can operate a user device 810. The user 806 may use the user device 810 to pay for a good or service at a resource provider such as a merchant. The merchant may operate a resource provider computer 830 and/or an access device 820. The merchant may communicate with an authorizing entity computer 860 operated by an issuer, via a transport computer 840 operated by an acquirer and a processing network 850 such a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a user device 810 at an access device 820 (e.g., POS location) can be described as follows. A user 806 presents his or her user device 810 to an access device 820 to pay for an item or service. The user device 810 and the access device 820 interact such that access data from the user device 810 (e.g., a payment token) is received by the access device 820 (e.g., via contact or contactless interface). With reference to the above description, the user device 810 can be the recipient computer that was loaded with the token corresponding to the credential associated with the sender of the sender computer.

The resource provider computer 830 may then receive this information from the access device 820 via an external communication interface. The resource provider computer 830 may then generate an authorization request message that includes the information received from the access device 820 (i.e. information corresponding to the user device 810) along with additional transaction information (e.g., a transaction amount, merchant specific information, etc.) and electronically transmits this information to a transport computer 840. The transport computer 840 may then receive, process, and forward the authorization request message to a processing network 850 for authorization.

In general, prior to the occurrence of a credit or debit-card transaction, the processing network 850 has an established protocol with each issuer on how the issuer's transactions are to be authorized. In some cases, such as when the transaction amount is below a threshold value, the processing network 850 may be configured to authorize the transaction based on information that it has about the user's account without generating and transmitting an authorization request message to the authorizing entity computer 860. In other cases, such as when the transaction amount is above a threshold value, the processing network 850 may receive the authorization request message, determine the issuer associated with the user device 810, and forward the authorization request message for the transaction to the authorizing entity computer 860 for verification and authorization. Once the transaction is authorized, the authorizing entity computer 860 may generate an authorization response message (that may include an authorization code indicating the transaction is approved or declined) and transmit this electronic message via its external communication interface to processing network 850. The processing network 850 may then forward the authorization response message to the transport computer 840, which in turn may then transmit the electronic message to comprising the authorization indication to the resource provider computer 830, and then to the access device 820.

If the access data is in the form of a token, then the processing network 850 may exchange the token for a real credential (e.g., a PAN). Any authorization request message may then be modified to include the real credential and it may be forward to the authorizing entity computer 860 for verification. The authorizing entity computer 860 can generate an authorization response message with an approval or decline. The authorization response message can be transmitted to the processing network 850, and the processing network 850 may replace the credential with the token. The processing network 850 may then transmit the authorization response message back to the access device 820.

If control data for the token as stored at the processing network computer 850 as described above with respect to FIGS. 2-3, then the control data may be applied to the authorization request message before the processing network computer 850 authorizes the transaction or forwards the authorization request message to the authorizing entity computer. For example, if the control data indicates that the token is only good for transactions under $100 and the transaction amount in the authorization request message is over $100, then the processing network computer 850 may automatically decline the transaction without contacting the authorizing entity computer 860.

At the end of the day or at some other suitable time interval, a clearing and settlement process between the resource provider computer 830, the transport computer 840, the processing network 850, and the authorizing entity computer 860 may be performed on the transaction.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Embodiments of the invention have a number of advantages. For example, as noted above, the distributed computer system described above can coordinate the sharing of data such that a single credential can be used for transactions conducted by two different user computers such as a sender computer and a recipient computer. The single credential can be tokenized to form a token which is loaded onto the recipient computer. Multiple tokens can be loaded onto multiple recipient computers, using the same credential such as the same primary account number. Controls can be set for each of those tokens. Thus, embodiments of the invention protect the credential from hackers or a man-in-the-middle since the real credential is not passed to any recipient computers. Embodiments of the invention are further scalable as any number of recipient devices can be verified and can receive a token corresponding to a real credential without undue difficulty.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

What is claimed is:

1. A method comprising:
receiving, by an authorizing entity computer, a request from a sender computer operated by a sender to allow a recipient operating a recipient computer to use a credential of the sender;
transmitting, by the authorizing entity computer, the credential to a processing network computer;
receiving, by the authorizing entity computer from the processing network computer, a credential identifier associated with the credential;
transmitting, by the authorizing entity computer, the credential identifier to the processing network computer, which thereafter initiates provisioning of a token corresponding to the credential to a storage application on the recipient computer; and
receiving, by the authorizing entity computer, a notification that the token is active in the storage application on the recipient computer,
wherein the credential identifier is transmitted to the processing network computer responsive to verifying the recipient computer via a verification process, and
wherein the verification process includes:

providing, to the recipient computer, a multi-factor authentication (MFA) request message, the MFA request message including a request for the recipient computer to provide a code to the authorizing entity computer;
receiving, from the recipient computer, a MFA response message including a challenge response; and
responsive to verifying that the challenge response matches the code provided in the MFA request message, associating the credential identifier and the credential with the recipient computer.

2. The method of claim 1, wherein the request from the sender computer to share the credential comprises control data for the token.

3. The method of claim 2, wherein the authorizing entity computer transmits the control data to the processing network computer after receiving the notification that the token is active.

4. The method of claim 2, wherein the control data limits transactions conducted using the token to specific amounts, locations, or resource providers.

5. The method of claim 1, wherein the processing network computer initiates provisioning of the token corresponding to the credential to the storage application on the recipient computer by sending an encrypted credential to the authorizing entity computer, and wherein the method further comprises:
receiving, by the authorizing entity computer, the encrypted credential from the processing network computer; and
transmitting, by the authorizing entity computer, the encrypted credential to the storage application on the recipient computer, which then transmits a request to the processing network computer for the token and then obtains the token.

6. The method of claim 1, wherein the recipient computer is configured to initiate a transaction using the token in the storage application on the recipient computer.

7. The method of claim 1, wherein the processing network computer initiates provisioning of the token corresponding to the credential to the storage application on the recipient computer by passing an encrypted credential to the storage application, which then transmits a request to the processing network computer for the token and then obtains the token.

8. The method of claim 1, wherein the recipient computer is a mobile phone.

9. The method of claim 1, further comprising:
receiving, from the processing network computer, a first portion of a password; and
providing, to the sender computer, the first portion of the password,
wherein the sender computer then forwards the first portion of the password to the recipient computer, and wherein the processing network computer is configured to forward a second portion of the password to the recipient computer.

10. The method of claim 9, wherein the processing network computer is configured to receive both the first portion of the password and the second portion of the password from the recipient computer, and validate the password.

11. The method of claim 1, further comprising:
receiving, from the sender computer, a message to edit control data for the token; and
forwarding, to the processing network computer, the edited control data for the token to update the control data for the token.

12. The method of claim 1, wherein multiple tokens for multiple recipient computers are associated with the token, and are stored in the processing network computer along with the credential and control data for each of the tokens in the multiple tokens.

13. The method claim 1, wherein the credential is a primary account number.

14. The method of claim 1, wherein the token is a payment token.

15. An authorizing entity computer comprising:
a processor; and
a non-transitory computer readable medium comprising instructions executable by the processor, causing the processor to perform operations including:
receiving a request from a sender computer operated by a sender to allow a recipient operating a recipient computer to use a credential of the sender;
transmitting the credential to a processing network computer;
receiving, from the processing network computer, a credential identifier associated with the credential;
transmitting the credential identifier to the processing network computer, which thereafter initiates provisioning of a token corresponding to the credential to a storage application on the recipient computer; and
receiving a notification that the token is active in the storage application on the recipient computer,
wherein the credential identifier is transmitted to the processing network computer responsive to verifying the recipient computer via a verification process, and wherein the verification process includes:
providing, to the recipient computer, a multi-factor authentication (MFA) request message, the MFA request message including a request for the recipient computer to provide a code to the authorizing entity computer;
receiving, from the recipient computer, a MFA response message including a challenge response; and
responsive to verifying that the challenge response matches the code provided in the MFA request message, associating the credential identifier and the credential with the recipient computer.

16. A method comprising:
receiving, by a processing network computer from an authorizing entity computer, a credential, where the credential is received from the authorizing entity computer via a sender computer operated by a sender in a message;
transmitting, from the processing network computer to the authorizing entity computer, a credential identifier associated with the credential;
receiving, by the processing network computer from the authorizing entity computer, the credential identifier;
initiating provisioning of a token corresponding to the credential to a storage application on a recipient computer; and
transmitting, by the processing network computer to the authorizing entity computer, a notification that the token is active in the storage application on the recipient computer,
wherein the credential identifier is transmitted to the processing network computer by the authorizing entity computer responsive to verifying the recipient computer via a verification process, and wherein the verification process includes:
providing, to the recipient computer, a multi-factor authentication (MFA) request message, the MFA request message including a request for the recipient computer to provide a code to the authorizing entity computer;

receiving, from the recipient computer, a MFA response message including a challenge response; and responsive to verifying that the challenge response matches the code provided in the MFA request message, associating the credential identifier and the credential with the recipient computer.

17. The method of claim 16, further comprising:

receiving, from the authorizing entity computer, control data for the token and storing the control data with the token and the credential in a database.

18. The method of claim 16, wherein the processing network computer initiates provisioning of the token corresponding to the credential to the storage application on the recipient computer by sending an encrypted credential to the authorizing entity computer, and wherein the method further comprises:

transmitting to the authorizing entity computer, the encrypted credential; and receiving from the encrypted credential from the storage application on the recipient computer; and transmitting the token to the storage application.

19. The method of claim 18, wherein the processing network computer initiates provisioning of the token corresponding to the credential to the storage application on the recipient computer by passing an encrypted credential to the storage application, and wherein the method further comprises:

receiving from the encrypted credential from the storage application on the recipient computer; and transmitting the token to the storage application.

20. The method of claim 16, wherein the sender computer and the recipient computer are mobile phones.

* * * * *